C. A. DISBROW.
INSULATING UNIT FOR RAIL JOINTS.
APPLICATION FILED APR. 21, 1919.
1,311,440.
Patented July 29, 1919.
2 SHEETS—SHEET 1.
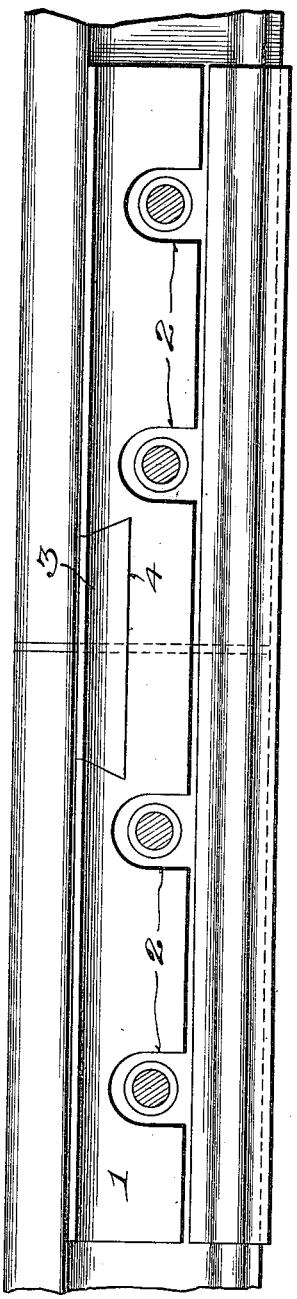
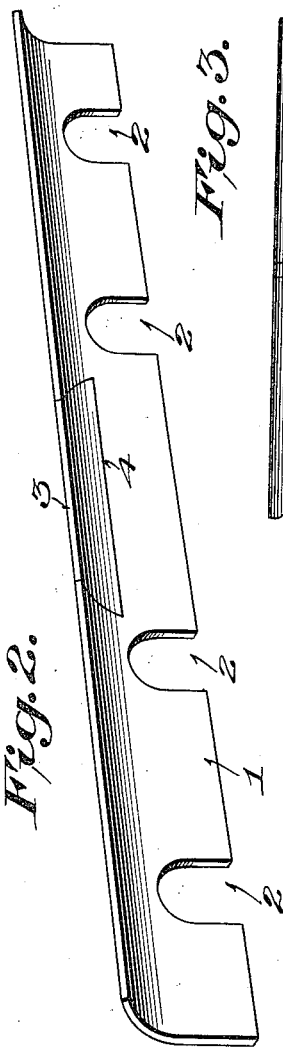
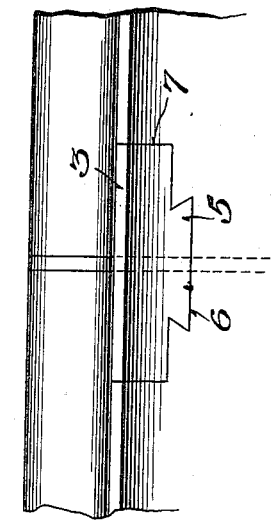
Witness
Inventor
Clarkson A. Disbrow,
By
Attorney C. A. DISBROW.
INSULATING UNIT FOR RAIL JOINTS.
APPLICATION FILED APR. 21, 1919.
1,311,440.
Patented July 29, 1919.
2 SHEETS—SHEET 2.
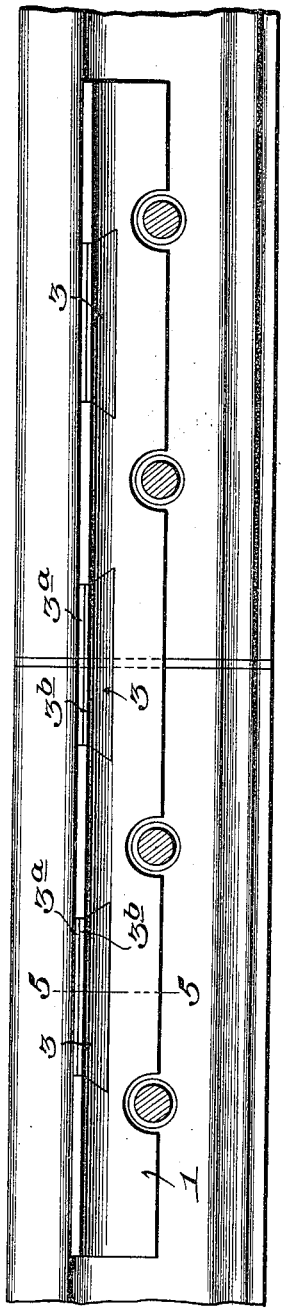
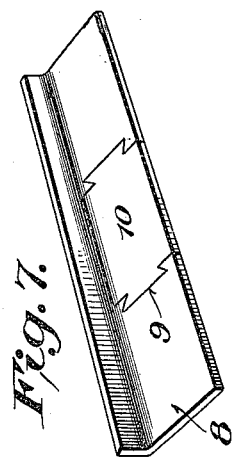
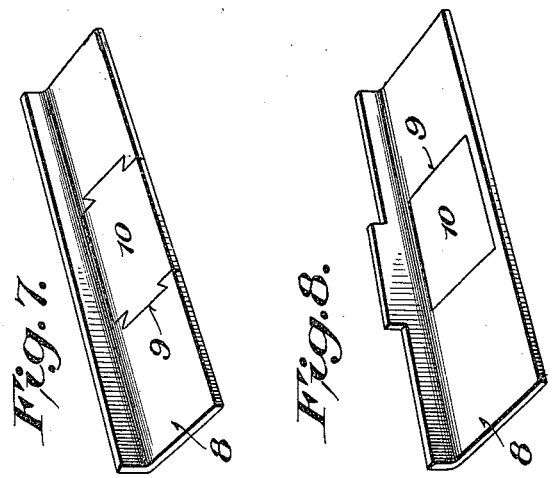
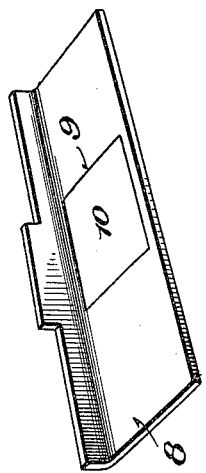
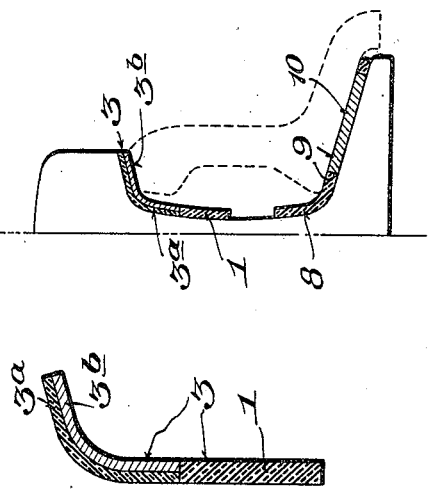
Inventor
Clarkson A. Disbrow,
By
Attorney
Witness

UNITED STATES PATENT OFFICE.

CLARKSON A. DISBROW, OF NEW ROCHELLE, NEW YORK, ASSIGNOR TO THE RAIL JOINT COMPANY, OF NEW YORK, N. Y., A CORPORATION OF NEW YORK.

INSULATING UNIT FOR RAIL-JOINTS.

1,311,440.     Specification of Letters Patent.     Patented July 29, 1919.

Application filed April 21, 1919. Serial No. 291,497.

*To all whom it may concern:*

Be it known that I, CLARKSON A. DISBROW, a citizen of the United States, residing at New Rochelle, in the county of Westchester and State of New York, have invented certain new and useful Improvements in Insulating Units for Rail-Joints, of which the following is a specification.

This invention relates to the subject of insulation for rail joints, and primarily has in view an improvement intended to effect greater economy in the use of insulation for rail joints, and at the same time facilitating removal and replacement of the worn or damaged part of the insulation.

Therefore, the present invention primarily provides a novel means of conserving that part of the rail joint insulation which is not subjected to very great wear and which ordinarily, under proper conditions, may satisfactorily remain in service for a considerable period of time. Experience with track insulation for rail joints has shown that the fiber or insulation material is usually subjected to the greatest wear and shock under the head of the receiving rail, and as a matter of fact excessive wear of the insulation material is limited to one or two comparatively small areas so that the amount of insulation that ordinarily wears out, or may be destroyed by crushing strains, is relatively small as compared with the entire area of the sheet of insulation. And, where the insulation is used in continuous strips or sheets the tearing or crushing out of the fiber, due to load and traffic conditions, is soon communicated to the remaining portions of good or unworn insulation which must therefore be entirely discarded and replaced by new strips or sheets.

Taking the above factors into consideration it is the purpose of the invention to provide a simple and practical improvement in insulation material for rail joints whereby that part of the insulation which is subject to the most rapid wear, or disintegrating influences, is readily removable or replaceable without disturbing or affecting the remaining portions of good or unworn insulation, thereby effecting substantial economies not only in the material itself but also in the cost of labor in making renewals.

A further practical object of the invention is to provide an insulating unit for rail joints having a replaceable wear insert or wear piece which may either be of a harder and better grade of material than the remaining body of insulation to better resist the disintegrating forces, or which may be of the same grade of material as the main body of insulation. In either aspect the same advantage will be obtained with respect to employing only a relatively small piece of insulation to take the main wear and shock of the load and traffic conditions.

Other objects of the invention will readily appear to those familiar with the art as the character of the invention is observed, and though susceptible of embodiment in a variety of forms of construction certain preferred and practical forms of the invention are shown in the accompanying drawings, in which:—

Figure 1 is a side elevation of a rail joint, with the joint bar removed exposing an insulation unit embodying the improvement contemplated by the present invention.

Fig. 2 is a perspective view of the improved insulation unit shown in Fig. 1 of the drawings.

Fig. 3 is a detail elevational view of the central part of the rail joint illustrating a modification in the mounting of the replaceable wear insert.

Fig. 4 is a view similar to Fig. 1 but illustrating a modification comprising a plurality of inserts of metal and fiber.

Fig. 5 is a detail cross-sectional view on the line 5—5 of Fig. 4.

Fig. 6 is a sectional view showing a modification wherein the replaceable wear insert may be applied to a base section of insulation as well as to a head section of insulation.

Fig. 7 is a detail perspective showing the application of the replaceable wear insert to a base section of insulation.

Fig. 8 is a detail perspective showing a modification in the use of the replaceable wear insert for base insulation.

Like references designate corresponding parts in the several figures of the drawings.

The present invention is applicable to any type or shape of fiber, or equivalent insulation, for rail joints, since the essential feature to be observed is the provision of a relatively small replaceable wear insert or wear piece, which, when worn or damaged, may be readily removed and replaced without disturbing or affecting the remaining good or unworn parts of the insulation. Accordingly, for illustrative purposes there is shown in Figs. 1 and 2 of the drawings an application of the invention to a head section of insulation designated by the numeral 1. This head section of insulation is illustrated as being in the form of a strip of fiber or equivalent insulation material adapted to be inserted between the head of the splice bar, and the underside of the head of the rail, and having suitable provision, such as the slots or notches 2, for interlocking with the joint bolts to prevent displacement of the insulation. This type of insulation may be readily adapted for use with the present invention. That is to say, according to the present invention it is proposed to employ a relatively small wear insert or wear piece of fiber or equivalent insulating material. This insert or wear piece is designated by the numeral 3, and preferably inserted in the main body or strip of insulation 1 at the central part thereof so as to engage beneath the undersides of the heads of the rail ends within the joint, and to bridge the joint between such rail ends. Such an arrangement of the replaceable wear insert 3 may be effected in a very simple manner as suggested in Figs. 1 and 2 of the drawings wherein a dovetailed or undercut mortise seat 4 may be cut into the top edge portion of the body of insulation 1 at the central part thereof, and the wear insert 3 correspondingly shaped to fit the mortise seat and in effect form a continuous part of the main body of insulation. With the wear insert arranged and fitted in place as thus indicated the same will be so located as to receive the shock and crushing strains, and when damaged or worn out may be readily removed or replaced without dismantling the joint and with a minimum amount of labor.

A great variety of ways may be resorted to for fitting the wear insert into the main body of insulation and for interlocking it therewith. Only a few of such ways are shown in the drawings, as for instance in Fig. 3 of the drawings the said insert may be provided with a separate dovetailed tenon 5 engaging a correspondingly shaped recess 6 formed in the bottom part of the main mortise 7 cut into the top of the insulation body or sheet for receiving the insert 3. Also, as suggested in Fig. 4 of the drawings the insulation insert may be distributed at spaced points within and along the top portion of the insulation body or sheet if traffic conditions in a particular location should make it desirable to have a plurality of these inserts at different points under the head of the rail, in addition to the main location under the rail ends within the joint. And, the illustration of Fig. 4 of the drawings is utilized to illustrate another phase of the invention that may be resorted to, namely, to make the replaceable wear insert of two matching members respectively of fiber 3$^a$ and of metal 3$^b$. The section of Fig. 5 shows a composite insert of that character wherein the fiber and metal plates are of the same form and dimension and are superimposed one upon the other with the insulation preferably next to the rail head and the metal plate next to the splice bar head, though such arrangement may be reversed without affecting this part of the invention.

It will also be understood that the replaceable wear insert or wear piece is available for use in connection with the base section of insulation such as ordinarily employed between the foot of the splice bar and the upper side of the rail flange. Such application of the invention is illustrated by Fig. 6 of the drawings which shows the upper section or body of insulation 1 fitted with a head insert 3, and a base section 8 of insulation having an opening or seat 9 therein within which is fitted a separate replaceable fiber or equivalent wear insert 10. In this use of the invention the fiber wear insert 10 at the base of the joint is preferably located at the center of the joint where the greatest strain occurs and therefore where the base section of insulation is most likely to be subject to the greatest wear. Figs. 7 and 8 of the drawings illustrate different forms of the seats or recess 9 in the base section of the insulation 8, within which the wear insert may be fitted, and as shown by these figures of the drawings the wear insert may or may not be interlocked to the body of insulation, as may be found desirable or preferable.

Various other forms and applications of the invention will now be obvious to those familiar with track insulation for rail joints and it will therefore be understood that changes in the form, proportion and minor details of construction may be resorted to without departing from the spirit or sacrificing any of the advantages of the invention.

I claim:—

1. An insulating unit for rail joints having a replaceable wear insert.

2. An insulating unit for rail joints comprising a body of insulation, and a replaceable wear piece inserted therein.

3. An insulating unit for rail joints comprising a body of insulation, having a mortise therein, and a replaceable wear piece inserted in the mortise.

4. An insulating unit for rail joints comprising a body of insulation having a mortise, and a replaceable wear piece interlocked within said mortise.

5. An insulating unit for rail joints comprising a body of insulation and a replaceable wear piece inserted in the top edge portion thereof.

6. An insulating unit for rail joints comprising a body of insulation, and a replaceable wear piece fitted to said body in the central part thereof.

7. An insulating unit for rail joints comprising a body of insulation, and a replaceable wear piece fitted to the central upper edge portion thereof.

8. An insulating unit for rail joints comprising a body of insulation provided in its central top edge portion with a mortise, and a replaceable wear piece inserted in said mortise and conforming to the shape of said body.

9. An insulating unit for rail joints comprising a body of insulation and a replaceable wear piece inserted in said body and conforming to the shape thereof.

10. An insulating unit for rail joints comprising a body of insulation and a plurality of replaceable wear pieces inserted in said body at spaced points.

11. An insulating unit for rail joints comprising a body of insulation and a replaceable wear insert therein consisting of superimposed fiber and metal plates.

In testimony whereof I hereunto affix my signature in the presence of two witnesses.

CLARKSON A. DISBROW.

Witnesses:
E. K. KERSHNER,
KATHERINE MCNALLY.

Copies of this patent may be obtained for five cents each, by addressing the "Commissioner of Patents, Washington, D. C."